United States Patent
Wagoner et al.

(10) Patent No.: US 9,343,991 B2
(45) Date of Patent: May 17, 2016

(54) CURRENT BALANCE CONTROL FOR NON-INTERLEAVED PARALLEL BRIDGE CIRCUITS IN POWER CONVERTER

(71) Applicant: General Electric Company, Schenectady, NY (US)

(72) Inventors: Robert Gregory Wagoner, Roanoke, VA (US); Anthony Michael Klodowski, Hardy, VA (US)

(73) Assignee: General Electric Company, Schenectady, NY (US)

( * ) Notice: Subject to any disclaimer, the term of this patent is extended or adjusted under 35 U.S.C. 154(b) by 279 days.

(21) Appl. No.: 13/744,975

(22) Filed: Jan. 18, 2013

(65) Prior Publication Data

US 2014/0204630 A1    Jul. 24, 2014

(51) Int. Cl.
| | | |
|---|---|---|
| *H02M 5/458* | (2006.01) | |
| *H02M 5/42* | (2006.01) | |
| *H02M 5/293* | (2006.01) | |
| *H02M 7/493* | (2007.01) | |
| *H02P 9/00* | (2006.01) | |
| *H02P 101/15* | (2015.01) | |

(52) U.S. Cl.
CPC ............. *H02M 5/42* (2013.01); *H02M 5/293* (2013.01); *H02M 5/4585* (2013.01); *H02M 7/493* (2013.01); *H02P 9/007* (2013.01); *H02P 2101/15* (2013.01); *H02P 2207/073* (2013.01)

(58) Field of Classification Search
CPC ...... H02M 5/4585; H02M 5/458; H02J 9/062
USPC .......... 363/37–41, 131, 132; 323/311; 322/91
See application file for complete search history.

(56) References Cited

U.S. PATENT DOCUMENTS

| 5,070,440 A | 12/1991 | Walker |
| 6,545,450 B1 | 4/2003 | Ledenev et al. |
| 6,751,106 B2 | 6/2004 | Zhang et al. |

(Continued)

FOREIGN PATENT DOCUMENTS

| DE | 4038869 C1 | 8/1991 |
| DE | 4323804 A1 | 1/1995 |

(Continued)

OTHER PUBLICATIONS

A PCT Search Report and Written Opinion issued in connection with corresponding Application No. PCT/US2014/010278 on Dec. 12, 2014.

*Primary Examiner* — Yemane Mehari
(74) *Attorney, Agent, or Firm* — Dority & Manning, P.A.

(57) ABSTRACT

Systems and methods for reducing current imbalance between parallel bridge circuits used in a power converter of a power generation system, such as a wind driven doubly fed induction generator (DFIG) system, are provided. The power converter can include a plurality of bridge circuits coupled in parallel to increase the output power capability of the system. Each of the bridge circuits can include a pair of switching elements, such as insulated gate bipolar transistors (IGBTs), coupled in series with one another. The switching elements of the parallel bridge circuits can be controlled, for instance, using control commands (e.g. pulse width modulation commands) according to a substantially non-interleaved switching pattern. The timing of the control commands according to the substantially non-interleaved switching pattern can be adjusted to reduce current imbalance between the parallel bridge circuits.

13 Claims, 4 Drawing Sheets

(56) References Cited

U.S. PATENT DOCUMENTS

| | | |
|---|---|---|
| 7,446,435 B2 | 11/2008 | Zhang et al. |
| 7,643,318 B2 | 1/2010 | Wagoner |
| 7,683,568 B2 * | 3/2010 | Pande et al. .................. 318/729 |
| 7,876,191 B2 | 1/2011 | Chandrasekaran et al. |
| 7,928,592 B2 * | 4/2011 | Wagoner et al. ................ 290/44 |
| 7,939,959 B2 | 5/2011 | Wagoner et al. |
| 7,944,068 B2 | 5/2011 | Wagoner et al. |
| 8,138,620 B2 | 3/2012 | Wagoner et al. |
| 8,270,191 B2 | 9/2012 | Zhu et al. |
| 8,310,074 B2 | 11/2012 | Larsen et al. |
| 2004/0233690 A1 | 11/2004 | Ledenev et al. |
| 2008/0054874 A1 | 3/2008 | Chandrasekaran et al. |
| 2010/0254168 A1 | 10/2010 | Chandrasekaran |
| 2010/0314872 A1 * | 12/2010 | Wagoner et al. ................ 290/44 |
| 2011/0140430 A1 * | 6/2011 | Ritter et al. .................... 290/44 |
| 2011/0299311 A1 * | 12/2011 | Zhu et al. ..................... 363/132 |
| 2011/0309875 A1 | 12/2011 | Wei et al. |

FOREIGN PATENT DOCUMENTS

| | | |
|---|---|---|
| EP | 0489971 A1 | 6/1992 |
| WO | 9502919 A1 | 1/1995 |

* cited by examiner

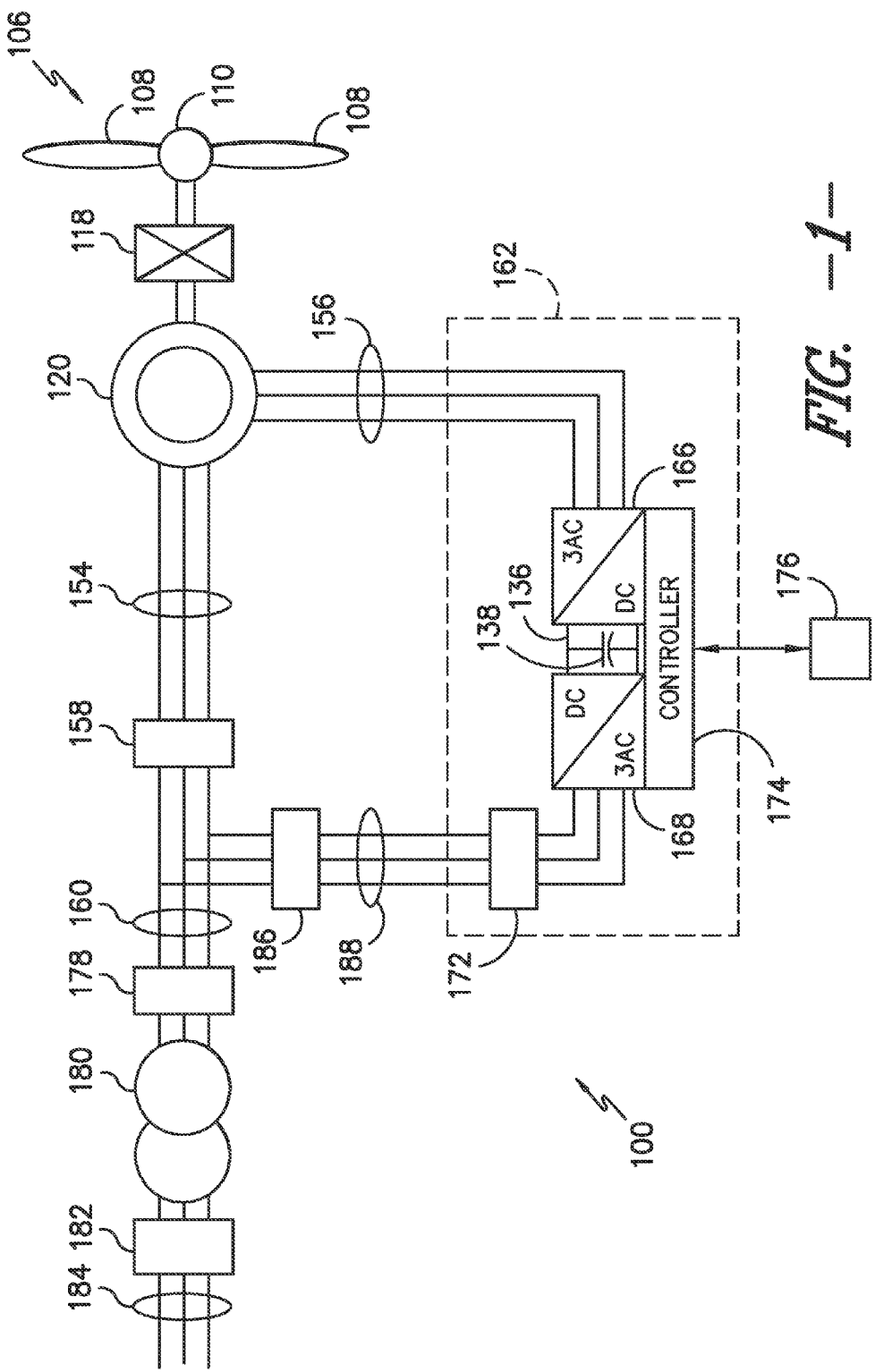
FIG. -1-

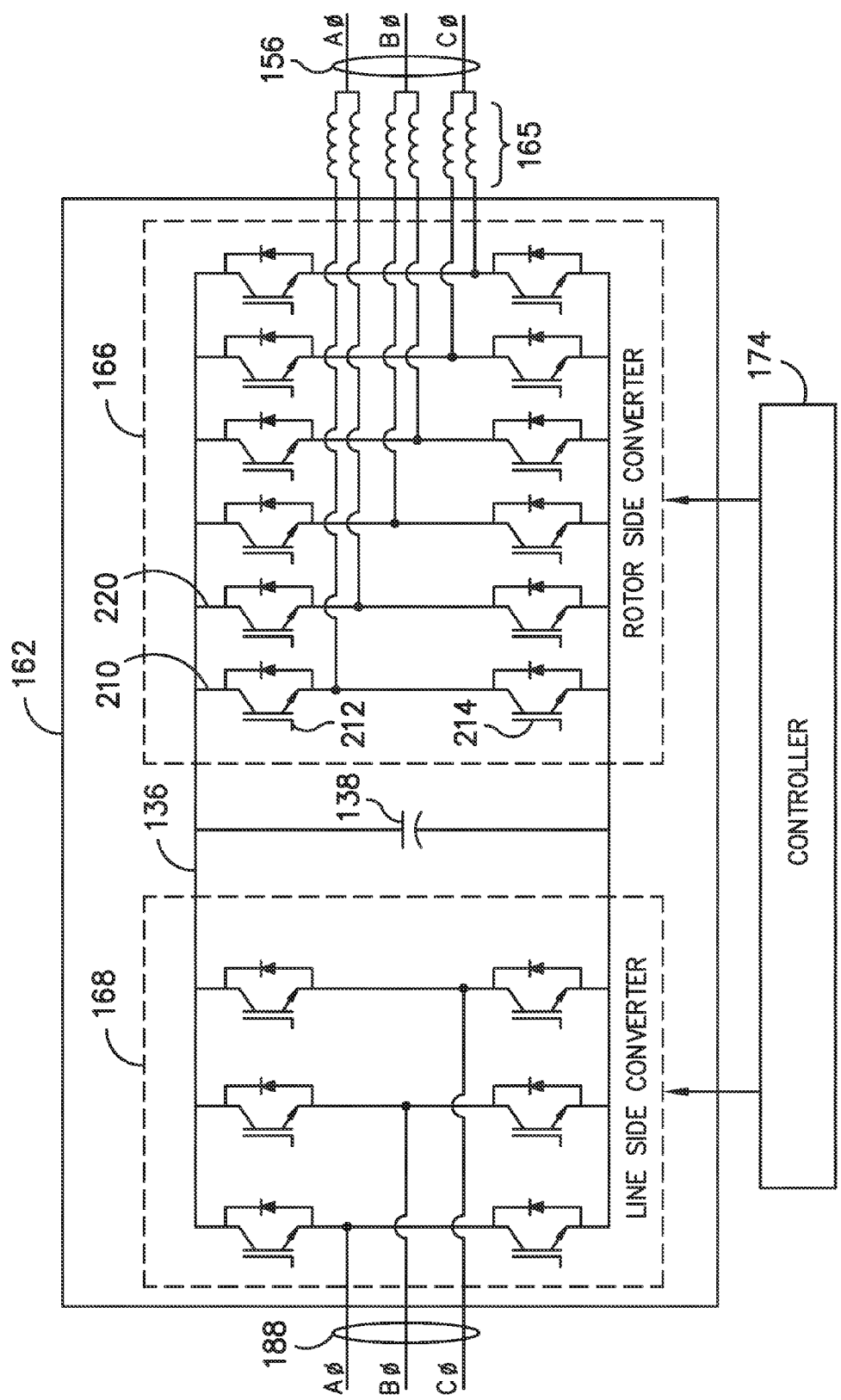
FIG. -2-

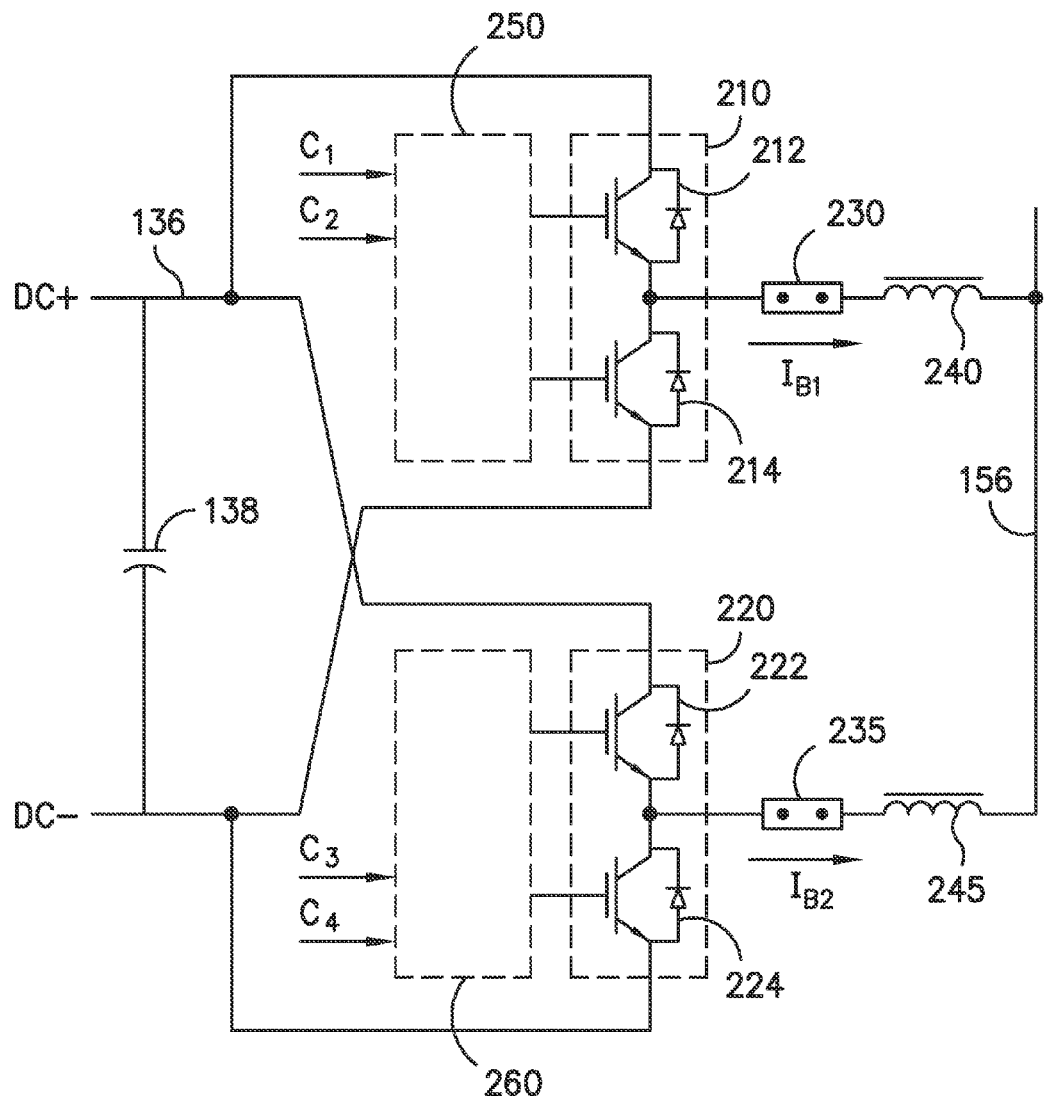
FIG. -3-

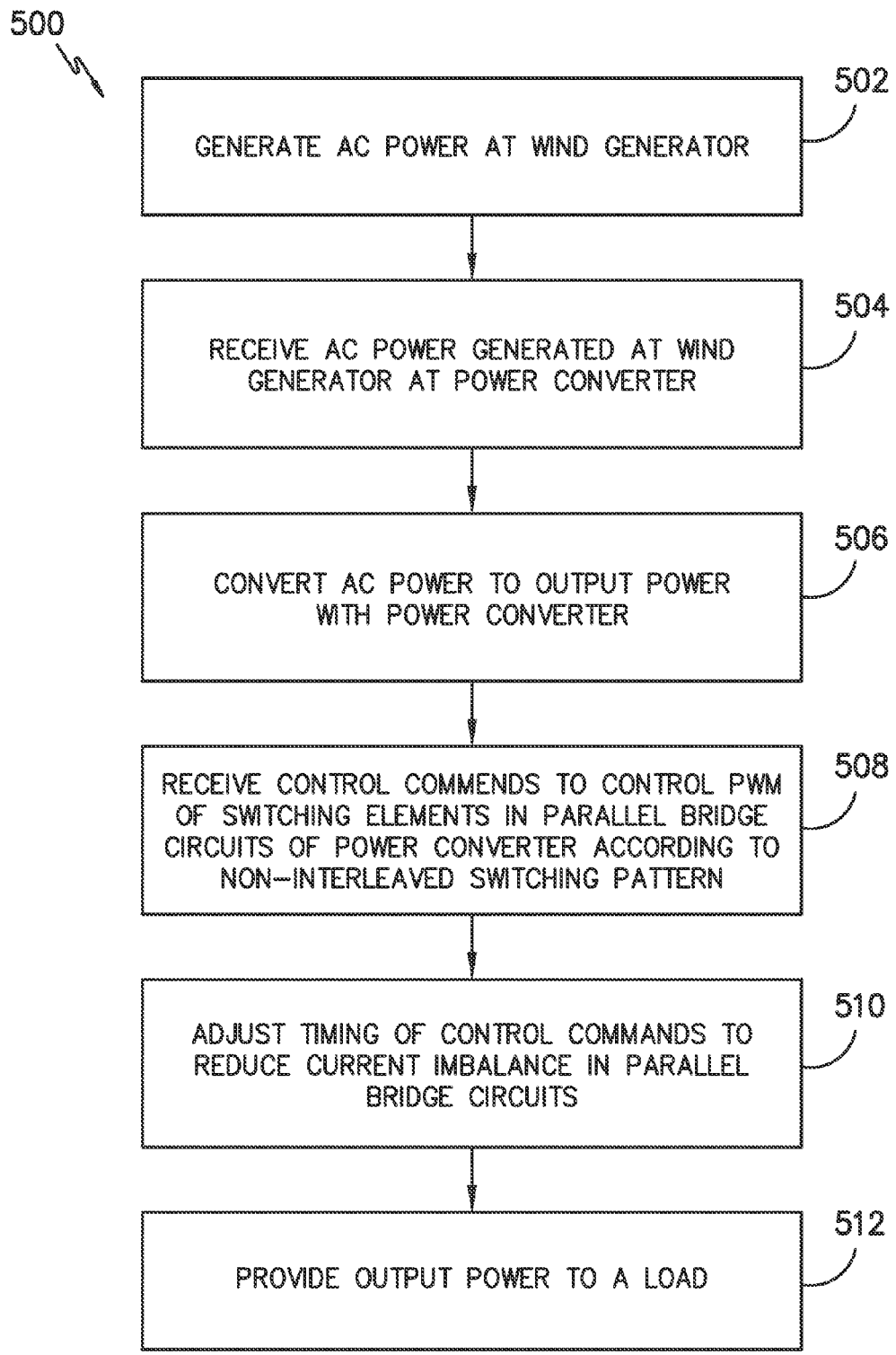
FIG. -4-

CURRENT BALANCE CONTROL FOR NON-INTERLEAVED PARALLEL BRIDGE CIRCUITS IN POWER CONVERTER

FIELD OF THE INVENTION

The present disclosure relates generally to power converters, and more particularly to systems and methods of improving output power for a power converter in a power generation system, such as a wind driven doubly-fed induction generator system.

BACKGROUND OF THE INVENTION

Power systems often include a power converter that is configured to convert an input power into a suitable power for application to a load, such as a generator, motor, electrical grid, or other suitable load. For instance, a power generation system, such as a wind generation system, can include a power converter for converting alternating current power generated at the generator into alternating current power at a grid frequency (e.g. 50/60 Hz) for application to a utility grid. An exemplary power generation system can generate AC power using a wind driven doubly fed induction generator (DFIG). A power converter can regulate the flow of electrical power between the DFIG and the grid.

Increased power DFIG systems can include a power converter that has multiple bridge circuits connected in parallel for each phase of the DFIG. Connecting multiple bridge circuits, such as H-bridge circuits, in parallel can provide for increased output power capability of the DFIG system. Each bridge circuit can include a plurality of switching elements (e.g. insulated gate bipolar transistors (Gifts)) driven by control commands. The control commands can control pulse-width-modulation (PWM) of the switching elements to provide a desired output of the power converter.

The switching elements in the parallel bridge circuits can be controlled according to various switching patterns. In an interleaved switching pattern, the switching elements in the parallel bridge circuits are switched in a manner out of phase with one another, such as 90° out of phase with one another. In a non-interleaved switching pattern, the switching elements in the parallel bridge circuits are switched in a nearly synchronous manner (i.e. at the same time).

Operating the switching elements of the parallel bridge circuits in an interleaved pattern can reduce harmonic content of the power converter output. However, differential mode chokes and other components can be necessary to reduce current imbalance which can result from interleaved control of the parallel bridge circuits. Operating parallel bridge circuits according to a non-interleaved switching pattern can still result in current imbalance among the parallel bridge circuits, particularly during transients (e.g. switching). A number of factors can lead to this imbalance. For example, driver circuits used to drive the bridge circuits can contain opt isolators for isolation of control signals. Each of these optoisolators can provide different delay times in the control signals. Different delay times in the control signals can cause minor differences in the switching times of the switching elements (e.g. IGBTs) used in the bridge circuits.

Typically, at least one inductive element is coupled between the plurality bridge circuit. The inductive element can be a stray line inductance between the parallel bridge circuits or output inductor of the power converter. Any difference in timing between switching of the switching elements can cause a voltage across the at least one inductive element, leading to a circulating current between the parallel bridge circuits. The circulating current can cause a current imbalance between the parallel bridge circuits. The imbalance in current can result in a difference of temperatures in the switching elements used in the parallel bridge circuits, such as a difference in junction temperature of IGBTs used in the switching elements. This reduces the overall output power capability of the power converter as the total output current capability is limited by the switching element with the highest temperature.

Thus, a need exists for a system and method of reducing current imbalance among parallel bridge circuits in a power converter used in power generation systems, such as wind generation systems.

BRIEF DESCRIPTION OF THE INVENTION

Aspects and advantages of the invention will be set forth in part in the following description, or may be obvious from the description, or may be learned through practice of the invention.

One exemplary aspect of the present disclosure is directed to a power converter system. The system includes a plurality of bridge circuits coupled in parallel. Each bridge circuit includes at least one switching element. The system further includes a control system configured to control pulse width modulation of the switching elements of the plurality of bridge circuits according to a substantially non-interleaved switching pattern. The control system is further configured to adjust timing of the control commands to reduce current imbalance between the plurality of bridge circuits coupled in parallel.

Another exemplary aspect of the present disclosure is directed to a method of providing an output power to a load. The method includes receiving, at a power converter, an alternating current power generated at generator. The method further includes converting, with the power converter, the alternating current power to an output power using a power converter. The power converter includes a plurality of bridge circuits coupled in parallel. Each bridge circuit includes a pair of switching elements coupled in series with one another. The method further includes receiving control commands to control pulse width modulation of the switching elements according to a substantially non-interleaved switching pattern and adjusting the timing of the control commands to reduce current imbalance between the plurality of bridge circuits coupled in parallel.

A further exemplary aspect of the present disclosure is directed to a doubly fed induction generator system. The doubly fed induction generator system includes a doubly fed induction generator configured to generate alternating current power. The system further includes a rotor side converter configured to receive the alternating current power and convert the alternating current power to a DC output. The power converter further includes a line side converter coupled to the rotor side converter via a DC bus. The line side converter is configured to receive the DC output from the rotor side converter and convert the DC power to an output power. At least one of the rotor side converter or the line side converter includes a plurality of bridge circuits coupled in parallel. Each bridge circuit includes a pair of switching elements coupled in series with one another. The power converter further includes a controller. The controller is configured to provide control commands to control pulse width modulation of the switching elements of the plurality of bridge circuits according to a substantially non-interleaved switching pattern. The controller is further configured to adjust the timing of the control commands to reduce current imbalance between the plurality of bridge circuits coupled in parallel.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 depicts an exemplary doubly fed induction generator (DFIG) wind turbine system according to an exemplary embodiment of the present disclosure;

FIG. 2 depicts aspects of an exemplary power converter used in a DFIG wind turbine system according to an exemplary aspect of the present disclosure;

FIG. 3 depicts a circuit diagram of exemplary parallel bridge circuits used in a rotor side converter according to an exemplary embodiment of the present disclosure; and FIG. 4 depicts a flow diagram of an exemplary method of providing an output power to a load according to an exemplary embodiment of the present disclosure.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, the present disclosure is directed to reducing current imbalance between parallel bridge circuits used in a power converter of a power generation system, such as a wind driven doubly fed induction generator (DFIG) system. The power converter can include a plurality of bridge circuits, such as a plurality of H-bridge circuits, coupled in parallel to increase the output power capability of the system. Each of the bridge circuits can include a pair of switching elements, such as insulated gate bipolar transistors (IGBTs), coupled in series with one another. The parallel bridge circuits can be controlled, for instance using control commands (e.g. pulse width modulation commands) provided to the switching elements, to provide a desired output to the electrical grid.

According to aspects of the present disclosure, a control system can control pulse width modulation of the switching elements of the parallel bridge circuits according to a substantially non-interleaved switching pattern. In particular, the switching elements of the parallel bridge circuits can be switched substantially in phase with one another (i.e. synchronously). Even though the switching elements are controlled according to a substantially non-interleaved switching pattern, small timing differences can exist between the switching of the switching elements in the parallel bridge circuits. These timing differences can result from, for instance, different delay times provided by optoisolators and other components of driver circuits used to condition the control commands for the switching elements. The timing differences can induce a voltage across at least one inductive element coupled between the plurality of parallel bridge circuits, resulting in a circulating current between the parallel bridge circuits. The circulating current can cause a current imbalance between the parallel bridge circuits.

To reduce any current imbalance resulting from these minor timing differences, the control system can be configured to adjust the timing of the control commands provided to the switching elements according to the substantially non-interleaved switching pattern to reduce current imbalance between the parallel bridge circuits. For instance, the control system can be configured to adjust the timing of the control commands provided to the switching elements to reduce or eliminate any minor timing differences of the switching elements in the parallel bridge circuits. The control system can adjust the timing of the control commands using a closed loop or an open loop control process. For instance, in an open loop control process, the timing of the control commands can be adjusted, for instance, by an operator of the system to reduce current imbalance. In a closed loop control process, the bridge current of the parallel bridge circuits can be monitored and used to adjust the timing of the control commands based on the measured bridge current.

Reducing current imbalance among the parallel bridge circuits controlled according to the substantially non-interleaved switching pattern can provide increased output power capability. For instance, the parallel bridge circuits can be controlled to have balanced currents such that reduced power is dissipated as current circulating between parallel bridge circuits. In addition, differences in temperature of the switching elements, such as junction temperature of IGBTs, may no longer limit output power capability for the power converter.

With reference now to the FIGS., exemplary embodiments of the present disclosure will now be discussed in detail. Referring to FIG. 1, an exemplary DFIG wind turbine system 100 will now be discussed in detail. The present disclosure will be discussed with reference to the exemplary DFIG wind turbine system 100 of FIG. 1 for purposes of illustration and discussion. Those of ordinary skill in the art, using the disclosures provided herein, should understand that aspects of the present disclosure are also applicable in other power generation systems.

In the exemplary system 100, a rotor 106 includes a plurality of rotor blades 108 coupled to a rotating hub 110, and together define a propeller. The propeller is coupled to an optional gear box 118, which is, in turn, coupled to a generator 120. In accordance with aspects of the present disclosure, the generator 120 is a doubly fed induction generator (DFIG) 120.

DFIG 120 is typically coupled to a stator bus 154 and a power converter 162 via a rotor bus 156. The stator bus 154 provides an output multiphase power (e.g. three-phase power) from a stator of DFIG 120 and the rotor bus 156 provides an output multiphase power (e.g. three-phase power) of a rotor of the DFIG 120. Referring to the power converter 162, DFIG 120 is coupled via the rotor bus 156 to a rotor side converter 166. The rotor side converter 166 is coupled to a line side converter 168 which in turn is coupled to a line side bus 188.

In exemplary configurations, the rotor side converter 166 and the line side converter 168 are configured for normal operating mode in a three-phase, pulse width modulation (PWM) arrangement using insulated gate bipolar transistor (IGBT) switching elements as will be discussed in more detail with respect to FIG. 2. The rotor side converter 166 and the line side converter 168 can be coupled via a DC link 136 across which is the DC link capacitor 138.

The power converter 162 can be coupled to a controller 174 to control the operation of the rotor side converter 166 and the line side converter 168. It should be noted that the controller 174, in typical embodiments, is configured as an interface between the power converter 162 and a control system 176. The controller 174 can include any number of control devices. In one implementation, the controller 174 can include a processing device (e.g. microprocessor, microcontroller, etc.) executing computer-readable instructions stored in a computer-readable medium. The instructions when executed by the processing device can cause the processing device to perform operations, including providing control commands (e.g. pulse width modulation commands) to the switching elements of the power converter 162.

In typical configurations, various line contactors and circuit breakers including, for example, grid breaker 182 can be included for isolating the various components as necessary for normal operation of DFIG 120 during connection to and disconnection from the electrical grid 184. A system circuit breaker 178 can couple the system bus 160 to a transformer 180, which is coupled to the electrical grid 184 via grid breaker 182.

In operation, alternating current power generated at DFIG 120 by rotating the rotor 106 is provided via a dual path to electrical grid 184. The dual paths are defined by the stator bus 154 and the rotor bus 156. On the rotor bus side 156, sinusoidal multi-phase (e.g. three-phase) alternating current (AC) power is provided to the power converter 162. The rotor side power converter 166 converts the AC power provided from the rotor bus 156 into direct current (DC) power and provides the DC power to the DC link 136. As will be discussed in more detail below, switching elements (e.g. IGBTs) used in parallel bridge circuits of the rotor side power converter 166 can be modulated to convert the AC power provided from the rotor bus 156 into DC power suitable for the DC link 136.

The line side converter 168 converts the DC power on the DC link 136 into AC output power suitable for the electrical grid 184. In particular, switching elements (e.g. IGBTs) used in bridge circuits of the line side power converter 168 can be modulated to convert the DC power on the DC link 136 into AC power on the line side bus 188. The AC power from the power converter 162 can be combined with the power from the stator of DFIG 120 to provide multi-phase power (e.g. three-phase power) having a frequency maintained substantially at the frequency of the electrical grid 184 (e.g. 50 Hz/60 Hz).

Various circuit breakers and switches, such as grid breaker 182, system breaker 178, stator sync switch 158, converter breaker 186, and line contactor 172 can be included in the system 100 to connect or disconnect corresponding buses, for example, when current flow is excessive and can damage components of the wind turbine system 100 or for other operational considerations. Additional protection components can also be included in the wind turbine system 100.

The power converter 162 can receive control signals from, for instance, the control system 176 via the controller 174. The control signals can be based, among other things, on sensed conditions or operating characteristics of the wind turbine system 100. Typically, the control signals provide for control of the operation of the power converter 162. For example, feedback in the form of sensed speed of the DFIG 120 can be used to control the conversion of the output power from the rotor bus 156 to maintain a proper and balanced multi-phase (e.g. three-phase) power supply. Other feedback from other sensors can also be used by the controller 174 to control the power converter 162, including, for example, stator and rotor bus voltages and current feedbacks. Using the various forms of feedback information, switching control signals (e.g. gate timing commands for IGBTs), stator synchronizing control signals, and circuit breaker signals can be generated.

FIG. 2 depicts aspects of an exemplary power converter 162 in accordance with aspects of the present disclosure. The rotor side converter 166 includes a plurality of bridge circuits (e.g. H-bridge circuits) coupled in parallel. More particularly, each phase of the rotor bus 156 input to the rotor side converter 166 is coupled to two bridge circuits. For instance, the A input to the rotor side converter 166 is coupled to bridge circuits 210 and 220 coupled in parallel. Using parallel bridge circuits can increase the output capability of the power converter 162.

As illustrated in FIG. 2, inductive elements 165 are coupled in series with bridge outputs of each of the plurality of bridge circuits of the rotor side converter 166. In particular, the inductive elements 165 are coupled in series with the bridge outputs of the plurality of bridge circuits before the bridge outputs are paralleled together to provide the parallel bridge circuits. As a result, the inductive elements 165 are effectively coupled between the parallel bridge circuits. The inductive elements 165 can be any suitable element having an inductance and can be representative of the inductance in wiring between the parallel bridge circuits. Alternatively, the inductive elements can be actual physical inductive elements that include coils of conductor and/or iron cores.

The line side converter 168 can also include a plurality of bridge circuits. In particular, the line side converter 168 includes a single bridge circuit for each output phase of the line converter 168. In FIG. 2, only the rotor side converter 166 is illustrated as having parallel bridge circuits. Those of ordinary skill in the art, using the disclosures provided herein, should appreciate that either the line side converter 168, the rotor side converter 166, or both the line side converter 168 and the rotor side converter 166 can include parallel bridge circuits without deviating from the scope of the present disclosure.

Each bridge circuit includes a plurality of switching elements (e.g. IGBTs) coupled in series with one another. For instance, each bridge circuit includes an upper IGBT (e.g. IGBT 212) and a lower IGBT (e.g. IGBT 214). A diode is coupled in parallel with each of the IGBTs. The line side converter 168 and the rotor side converter 166 are controlled, for instance, by providing control commands, using a suitable driver circuit, to the gates of the IGBTs. For example, the controller 174 can provide suitable gate timing commands to the gates of the IGBTs of the bridge circuits. The control commands can control the pulse width modulation of the IGBTs to provide a desired output. According to aspects of the present disclosure, the parallel bridge circuits, such as parallel bridge circuits 210 and 220, can be controlled according to a substantially non-interleaved switching pattern such that the switching elements of the parallel bridge circuits are switched in phase with one another. For instance, the upper IGBTs of the parallel bridge circuits can be switched in phase with one another and the lower IGBTs of the parallel bridge circuits can be switched in phase with another. It will be appreciated by those of ordinary skill in the art that other suitable switching elements can be used in place of IGBTs.

FIG. 3 depicts a circuit diagram of exemplary paralleled bridge circuits 210 and 220 used in the rotor side converter 166 of power converter 162 according to an exemplary embodiment of the present disclosure. The parallel bridge circuits are associated with a single phase of the rotor side converter 166, such as the A of the rotor side converter 166. As depicted, a first bridge circuit 210 including upper IGBT 212 and lower IGBT 214 is coupled in parallel with a second bridge circuit 220 including upper IGBT 222 and lower IGBT 224. The first bridge circuit 210 and the second bridge circuit 220 each have a bridge line coupled to the rotor bus 156 through respective inductive elements 240 and 245. The inductive elements 240 and 245 are effectively coupled between the bridge circuits 210 and 220. As discussed above, the inductive elements 240 and 245 can be any suitable element having an inductance and can be representative of the inductance in wiring between the parallel bridge circuits. Alternatively, the inductive elements 240 and 245 can be actual physical inductive elements that include coils of conductor and/or iron cores. The first bridge circuit 210 and the second bridge circuit 220 are also coupled to the DC link 136.

As illustrated, the first bridge circuit 210 is in communication with a driver circuit 250 that is configured to provide gate driving signals to the gates of the upper IGBT 212 and the lower IGBT 214 of the first bridge circuit 210 to control the pulse width modulation of the upper IGBT 212 and the lower IGBT 214. Similarly, the second bridge circuit 220 is in communication with a driver circuit 260 that is configured to provide gate driving signals to the gates of the upper IGBT 222 and the lower IGBT 224 of the second bridge circuit 220 to control the pulse width modulation of the upper IGBT 222 and the lower IGBT 224.

The gate driving signals provided by the driver circuits 250 and 260 are based on control commands $C_1$, $C_2$, $C_3$, and $C_4$ provided by the controller 174 (shown in FIG. 2). In particular, the controller 174 can provide control commands $C_1$ and $C_2$ to the driver circuit 250 to control pulse width modulation of the IGBTs 212 and 214 of the bridge circuit 210. The controller 174 can provide control commands $C_3$ and $C_4$ to driver circuit 260 to control pulse width modulation of the IGBTs 222 and 224 of the bridge circuit 220. The control commands $C_1$, $C_2$, $C_3$, and $C_4$ can control the switching of the IGBTs of the bridge circuits 210 and 220 according to a substantially non-interleaved switching pattern. The driver circuits 250 and 260 can amplify, isolate, and otherwise condition the control commands $C_1$, $C_2$, $C_3$, and $C_4$ to gate driving commands suitable for gating the IGBTs. As discussed above, different delay times can be provided by the driver circuits 250 and 260, resulting in timing differences in the switching of the IGBTs in the parallel bridge circuits 210 and 220. These timing differences can create current imbalance between the parallel bridge circuits 210 and 220.

More particularly, the first bridge circuit 210 can provide a first bridge current $I_{B1}$ and second bridge circuit 220 can provide a second bridge current $I_{B2}$. Different delay times in the gate driving commands provided by the driver circuits 250 and 260 can cause differences in the switching times of the IGBTs used in the bridge circuits 210 and 220. This difference in timing can induce a voltage across an inductive load (e.g. inductive elements 240 and 245), leading to a circulating current between the parallel bridge circuits 210 and 220. This circulating current can cause an imbalance in the bridge currents $I_{B1}$ and $I_{B2}$, resulting in less efficient operation of the power converter 162.

According to aspects of the present disclosure, the control commands $C_1$, $C_2$, $C_3$, and $C_4$ provided to the driver circuits 250 and 260 according to the substantially non-interleaved switching pattern can be adjusted to reduce current imbalance between the parallel bridge circuits. More particularly, the timing of the control commands $C_1$, $C_2$, $C_3$, and $C_4$ can be adjusted to compensate for delay times in the driver circuits 250 and 260 such that the timing differences in switching of the IGBTs of the parallel bridge circuits 210 and 220 are reduced.

The control commands $C_1$, $C_2$, $C_3$, and $C_4$ can be adjusted according to an open loop or a closed loop control process. In an open loop control process, the timing of control commands $C_1$, $C_2$, $C_3$, and $C_4$ can be adjusted, for instance, by an operator of the system to reduce current imbalance between the parallel bridge circuits 210 and 220. In a closed loop control process, the timing of the control commands $C_1$, $C_2$, $C_3$, and $C_4$ can be adjusted based on the bridge currents $I_{B1}$ and $I_{B2}$ of the parallel bridge circuits 210 and 220.

In particular, the bridge currents $I_{B1}$ and $I_{B2}$ can be monitored using a suitable current sensor. FIG. 3 depicts the use of a current shunt 230 to monitor bridge current $I_{B1}$ and a current shunt 235 to monitor bridge current $I_{B2}$. Other suitable current measurement devices or sensors can be used without deviating from the present disclosure. Signals indicative of the bridge current $I_{B1}$ and $I_{B2}$ can be used to adjust the timing of the control commands $C_1$, $C_2$, $C_3$, and $C_4$ to reduce current imbalance. For instance, the timing of the control commands $C_1$, $C_2$, $C_3$, and $C_4$ can be adjusted to reduce the difference between the bridge current $I_{B1}$ and $I_{B2}$.

FIG. 4 depicts a flow diagram of an exemplary method (500) for reducing current imbalance between parallel bridge circuits used in a power converter of a wind turbine system according to an exemplary embodiment of the present disclosure. The method (500) can be implemented using any suitable power generation system, such as the system illustrated in FIGS. 1-3. In addition, although FIG. 4 depicts steps performed in a particular order for purposes of illustration and discussion, the methods discussed herein are not limited to any particular order or arrangement. One skilled in the art, using the disclosures provided herein, will appreciate that various steps of the methods can be omitted, rearranged, combined and/or adapted in various ways.

At (502), the method includes generating alternating current power at a wind driven generator. For instance, alternating current power can be generated at a rotor of a wind driven DFIG. The alternating current power can be a multiphase alternating current power, such as a three-phase alternating current power. The generated alternating current power can be provided to a rotor bus such that the alternating current power can be received at a power converter (504).

At (506), the alternating current power generated at the wind driven generator is converted by the power converter to an output power suitable for application to a load. The power converter can include a plurality of bridge circuits coupled in parallel for each phase of the power converter. Each bridge circuit can include a plurality of switching elements (e.g. IGBTs) coupled in series with one another. Pulse width modulation of the switching elements can be controlled to provide a suitable output power for application to a load.

For instance, in one implementation, the power converter can be a two-stage power converter that includes a rotor side converter and a line side converter coupled together by a DC link. The rotor side converter and/or the line side converter can include a plurality of bridge circuits coupled in parallel. Each of the plurality of bridge circuits can include a plurality of switching elements coupled in series with one another. The switching elements of the bridge circuits in the rotor side converter can be controlled to convert the alternating current power to a DC power for application to the DC link. The line side converter can include a plurality of bridge circuits for converting the DC power on the DC link to an output power suitable for application to the load.

At (508), the method includes receiving control commands to control pulse width modulation of the switching elements in the parallel bridge circuits of the power converter according to a substantially non-interleaved switching pattern. In particular, control commands can be received from a control system to control pulse width modulation of the switching elements of the parallel bridge circuits such that the switching elements are switched substantially in phase with one another.

At (510), the timing of the control commands is adjusted to reduce current imbalance between the parallel bridge circuits. In particular, the timing of the control commands can be adjusted to reduce any time differences resulting from conditioning of the control commands by gate driver circuits used to drive the switching elements. The timing of the control commands can be adjusted by an open loop or a closed loop control process. In the closed loop control process, the timing of the control commands can be adjusted by monitoring a bridge current of each of the plurality of bridge circuits and adjusting the timing of the control commands based on the bridge current. For instance, the timing of the control commands can be adjusted to reduce the difference in bridge current of each of the plurality of bridge circuits.

At (512), the output power is provided from the power converter to a load. The load can include, but is not limited to, a motor, electrical grid, resistive load or other load. While an electrical grid is traditionally a supplier of power, the electrical grid can act as a load for the wind turbine system.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A power converter system, comprising:
    a power converter providing a multiphase output, said power converter comprising a plurality of bridge circuits coupled in parallel for each phase of the multiphase output of the power converter, each bridge circuit comprising at least one switching element; and
    a control system configured to provide control commands to the switching elements of the plurality of bridge circuits to control pulse width modulation of the switching elements according to a substantially non-interleaved switching pattern such that the switching elements of the plurality of bridge circuits coupled in parallel are switched substantially in phase with one another, the control system further configured to adjust timing of the control commands to reduce current imbalance between the plurality of bridge circuits coupled in parallel for each phase of the multiphase output based at least in part on a measured bridge current for each of the plurality of bridge circuits coupled in parallel.

2. The power converter system of claim 1, wherein the switching element comprises an insulated gate bipolar transistor (IGBT).

3. The power converter system of claim 1, wherein the power converter comprises a rotor side converter and a line side converter.

4. The power converter system of claim 1, wherein at least one inductive element is coupled between the plurality of bridge circuits.

5. The power converter system of claim 4, wherein the at least one inductive element comprises an output inductor coupled in series with a bridge output for each of the plurality of bridge circuits coupled in parallel.

6. The power converter system of claim 1, wherein the power converter is coupled to a wind driven doubly fed induction generator.

7. The power converter system of claim 6, wherein said power converter is coupled to a rotor of said wind driven doubly fed induction generator.

8. A method of providing an output power to a load, comprising:
    receiving, at a power converter, an alternating current power generated at a generator;
    converting, with the power converter, the alternating current power to multiphase output power, the power converter comprising a plurality of bridge circuits coupled in parallel for each phase of a multiphase output of the power converter, each bridge circuit comprising a pair of switching elements coupled in series with one another;
    receiving control commands to control pulse width modulation of the switching elements according to a substantially non-interleaved switching pattern such that the switching elements of the plurality of bridge circuits coupled in parallel are switching substantially in phase with one another; and
    adjusting the timing of the control commands to reduce current imbalance between the plurality of bridge circuits coupled in parallel based at least in part on a measured bridge current for each of the plurality of bridge circuits coupled in parallel.

9. The method of claim 8, wherein the method further comprises providing the output power to the load.

10. The method of claim 9, wherein the load comprises an electrical grid.

11. A doubly fed induction generator system, comprising:
    a doubly fed induction generator configured to generate alternating current power;
    a rotor side converter configured to receive the alternating current power and convert the alternating current power to a DC output;
    a line side converter coupled to said rotor side converter via a DC link, the line side converter configured to receive the. DC output from the rotor side converter and convert the DC power to a multiphase output power, at least one of the rotor side converter comprising a plurality of bridge circuits coupled in parallel for each phase of a multiphase output of the rotor side converter, each bridge circuit comprising a pair of switching elements coupled in series with one another; and
    a controller, said controller configured to provide control commands to control pulse width modulation of the switching elements of the plurality of bridge circuits according to a substantially non-interleaved switching pattern such that the plurality of bridge circuits coupled in parallel are switched substantially in phase with. one another, the controller further configured to adjust the timing of the control commands to reduce current imbalance between the plurality of bridge circuits coupled in parallel based at least in part on a measured bridge current for each of the plurality of bridge circuits coupled in parallel.

12. The power converter of claim 11, wherein an inductive element is coupled between the plurality of bridge circuits coupled in parallel.

13. The power converter of claim 11, wherein the power converter comprises a plurality of current sensors, each current sensor configured to provide a signal indicative of a bridge current of one of the plurality of bridge circuits coupled in parallel.

\* \* \* \* \*